United States Patent [19]

Fraley

[11] 3,874,939

[45] Apr. 1, 1975

[54] HERBICIDAL COMPOSITIONS CONTAINING CYCLOALKYL CARBAMATES AS SOIL LIFE EXTENDERS

[75] Inventor: Richard W. Fraley, Barberton, Ohio

[73] Assignee: PPG Industries, Inc., Pittsburgh, Pa.

[22] Filed: Dec. 19, 1972

[21] Appl. No.: 316,595

Related U.S. Application Data

[62] Division of Ser. No. 148,175, May 28, 1971, Pat. No. 3,734,945.

[52] U.S. Cl................ 71/111, 71/106, 71/118
[51] Int. Cl................................... A01n 9/20
[58] Field of Search.................. 71/111, 106, 118

[56] References Cited
UNITED STATES PATENTS 2,776,196  1/1957  Gysin et al............................ 71/111
2,776,197  1/1957  Gysin et al............................ 71/111
3,382,280  5/1968  Huffman............................... 71/118

FOREIGN PATENTS OR APPLICATIONS

1,186,472  4/1970  United Kingdom.................. 71/111

Primary Examiner—James O. Thomas, Jr.
Attorney, Agent, or Firm—Mark Levin

[57] ABSTRACT

The soil lives of many herbicides may be extended combining them with various O-phenylcarbamates having one or two cycloalkyl groups attached to the carbamic nitrogen atom. An exemplary composition is a mixture of isopropyl N-(3-chlorophenyl)carbamate and 4-chlorophenyl N-cyclohexylcarbamate.

21 Claims, No Drawings

HERBICIDAL COMPOSITIONS CONTAINING CYCLOALKYL CARBAMATES AS SOIL LIFE EXTENDERS

This is a division of application Ser. No. 148,175, filed May 28, 1971, now U.S. Pat. No. 3,734,945, granted May 22, 1973.

In accordance with this invention, there are provided carbamates which are effective in extending the soil lives of many herbicides such as isopropyl N-phenylcarbamate, isopropyl N-(3-chlorophenyl)carbamate, N,N-diallyl-2-chloroacetamide, 3,4-dichloropropionanilide, and 3,4-dichloromethacrylanilide.

Carbamates here contemplated may be represented by the structural formula:

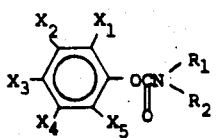

wherein:
$R_1$ is cycloalkyl;
$R_2$ is hydrogen, alkyl or cycloalkyl; and
$X_1, X_2, X_3, X_4,$ and $X_5$ are each independently hydrogen or halogen.

When any of $X_1, X_2, X_3, X_4,$ or $X_5$ is halogen, it may be fluorine, chlorine, bromine, or iodine. Chlorine or bromine is most often used. Chlorine is preferred. When two or more X's are halogen, they may be the same halogen or different halogens. It is more common for them to be the same.

$R_1$ is generally a lower cycloalkyl. It typically contains from 3 to 12 carbon atoms. Ordinarily, $R_1$ contains from 6 to 8 carbon atoms. Cyclohexyl is preferred.

When $R_2$ is alkyl, it often is lower alkyl. The alkyl may be straight or branched. It typically contains from 1 to 8 carbon atoms. From 1 to 4 carbon atoms is usual. Methyl and ethyl are preferred. Methyl is most preferred.

When $R_2$ is cycloalkyl, it often is lower cycloalkyl. It ordinarily contains from 3 to 12 carbon atoms. From 6 to 8 carbon atoms are more frequently used. Cyclohexyl is preferred.

When $R_2$ is hydrogen, the compounds of the invention are phenyl N-cycloalkylcarbamates. Examples of these compounds are:
phenyl N-cyclopropylcarbamate
phenyl N-cyclobutylcarbamate
phenyl N-cyclopentylcarbamate
phenyl N-cyclohexylcarbamate
phenyl N-cycloheptylcarbamate
phenyl N-cyclooctylcarbamate
phenyl N-cyclononylcarbamate
phenyl N-cyclodecylcarbamate
phenyl N-cycloundecylcarbamate
phenyl N-cyclododecylcarbamate
2-chlorophenyl N-cycloundecylcarbamate
2-chlorophenyl N-cyclobutylcarbamate
2-chlorophenyl N-cyclopentylcarbamate
2-chlorophenyl N-cyclohexylcarbamate
2-chlorophenyl N-cycloheptylcarbamate
2-chlorophenyl N-cyclooctylcarbamate
2-chlorophenyl N-cyclononylcarbamate
2-chlorophenyl N-cyclodecylcarbamate
2-chlorophenyl N-cycloundecylcarbamate
2-chlorophenyl cyclododecylcarbamate
2-bromophenyl N-cyclohexylcarbamate
3-chlorophenyl N-cyclopropylcarbamate
3-chlorophenyl N-cyclobutylcarbamate
3-chlorophenyl N-cyclopentylcarbamate
3-chlorophenyl N-cyclohexylcarbamate
3-chlorophenyl N-cycloheptylcarbamate
3-chlorophenyl N-cyclooctylcarbamate
3-chlorophenyl N-cyclononylcarbamate
3-chlorophenyl N-cyclodecylcarbamate
3-chlorophenyl N-cycloundecylcarbamate
3-chlorophenyl N-cyclododecylcarbamate
3-bromophenyl N-cyclopropylcarbamate
3-bromophenyl N-cyclohexylcarbamate
3-bromophenyl N-cyclooctylcarbamate
3-bromophenyl N-cyclodecylcarbamate
3-fluorophenyl N-cyclobutylcarbamate
3-fluorophenyl N-cyclohexylcarbamate
3-fluorophenyl N-cyclooctylcarbamate
3-iodophenyl N-cyclohexylcarbamate
2,3-dichlorophenyl N-cyclopropylcarbamate
2,3-dichlorophenyl N-cyclobutylcarbamate
2,3-dichlorophenyl N-cyclopentylcarbamate
2,3-dichlorophenyl N-cyclohexylcarbamate
2,3-dichlorophenyl N-cycloheptylcarbamate
2,3-dichlorophenyl N-cyclooctylcarbamate
2,3-dichlorophenyl N-cyclononylcarbamate
2,3-dichlorophenyl N-cyclodecylcarbamate
2,3-dichlorophenyl N-cycloundecylcarbamate
2,3-dichlorophenyl N-cyclododecylcarbamate
2,3-difluorophenyl N-cyclopentylcarbamate
2,3-dibromophenyl N-cyclohexylcarbamate
2-fluoro-3-chlorophenyl N-cyclohexylcarbamate
2,4-dichlorophenyl N-cyclopropylcarbamate
2,4-dichlorophenyl N-cyclobutylcarbamate
2,4-dichlorophenyl N-cyclopentylcarbamate
2,4-dichlorophenyl N-cyclohexylcarbamate
2,4-dichlorophenyl N-cycloheptylcarbamate
2,4dichlorophenyl N-cyclooctylcarbamate
2,4-dichlorophenyl N-cyclononylcarbamate
2,4-dichlorophenyl N-cyclodecylcarbamate
2,4-dichlorophenyl N-cycloundecylcarbamate
2,4-dichlorophenyl N-cyclododecylcarbamate
2,4-dibromophenyl N-cycloundecylcarbamate
2,5-dichlorophenyl N-cyclopropylcarbamate
2,5-dichlorophenyl N-cyclobutylcarbamate
2,5-dichlorophenyl N-cyclopentylcarbamate
2,5-dichlorophenyl N-cyclohexylcarbamate
2,5-dichlorophenyl N-cycloheptylcarbamate
2,5-dichlorophenyl N-cyclooctylcarbamate
2,5-dichlorophenyl N-cyclononylcarbamate
2,5-dichlorophenyl N-cyclodecylcarbamate
2,5-dichlorophenyl N-cycloundecylcarbamate
2,5-dichlorophenyl N-cyclododecylcarbamate
2,5-difluorophenyl N-cyclohexylcarbamate
2,6-dichlorophenyl N-cyclopropylcarbamate
2,6-dichlorophenyl N-cyclobutylcarbamate
2,6-dichlorophenyl N-cyclopentylcarbamate
2,6-dichlorophenyl N-cyclohexylcarbamate
2,6-dichlorophenyl N-cycloheptylcarbamate
2,6-dichlorophenyl N-cyclooctylcarbamate
2,6-dichlorophenyl N-cyclononylcarbamate
2,6-dichlorophenyl N-cyclodecylcarbamate
2,6-dichlorophenyl N-cycloundecylcarbamate
2,6-dichlorophenyl N-cyclododecylcarbamate 3,4-dichlorophenyl N-cyclopropylcarbamate
3,4-dichlorophenyl N-cyclobutylcarbamate
3,4-dichlorophenyl N-cyclopentylcarbamate
3,4-dichlorophenyl N-cyclohexylcarbamate
3,4-dichlorophenyl N-cycloheptylcarbamate
3,4-dichlorophenyl N-cyclooctylcarbamate
3,4-dichlorophenyl N-cyclononylcarbamate
3,4-dichlorophenyl N-cyclodecylcarbamate
3,4-dichlorophenyl N-cycloundecylcarbamate
3,4-dichlorophenyl N-cyclododecylcarbamate
3,4-dibromophenyl N-cyclohexylcarbamate
3,4-difluorophenyl N-cyclohexylcarbamate
3,5-dichlorophenyl N-cyclopropylcarbamate
3,5-dichlorophenyl N-cyclobutylcarbamate
3,5-dichlorophenyl N-cyclopentylcarbamate
3,5-dichlorophenyl N-cyclohexylcarbamate
3,5-dichlorophenyl N-cycloheptylcarbamate
3,5-dichlorophenyl N-cyclooctylcarbamate
3,5-dichlorophenyl N-cyclononylcarbamate
3,5-dichlorophenyl N-cyclodecylcarbamate
3,5-dichlorophenyl N-cycloundecylcarbamate
3,5-dichlorophenyl N-cyclododecylcarbamate
3,5-dibromophenyl N-cyclobutylcarbamate
2,3,4-trichlorophenyl N-cyclopropylcarbamate
2,3,4-trichlorophenyl N-cyclobutylcarbamate
2,3,4-trichlorophenyl N-cyclopentylcarbamate
2,3,4-trichlorophenyl N-cyclohexylcarbamate
2,3,4-trichlorophenyl N-cycloheptylcarbamate
2,3,4-trichlorophenyl N-cyclooctylcarbamate
2,3,4-trichlorophenyl N-cyclononylcarbamate
2,3,4-trichlorophenyl N-cyclodecylcarbamate
2,3,4-trichlorophenyl N-cycloundecylcarbamate
2,3,4-trichlorophenyl N-cyclododecylcarbamate
2,3,4-tribromophenyl N-cyclopropylcarbamate
2,3,5-trichlorophenyl N-cyclopropylcarbamate
2,3,5-trichlorophenyl N-cyclobutylcarbamate
2,3,5-trichlorophenyl N-cyclopentylcarbamate
2,3,5-trichlorophenyl N-cyclohexylcarbamate
2,3,5-trichlorophenyl N-cycloheptylcarbamate
2,3,5-trichlorophenyl N-cyclooctylcarbamate
2,3,5-trichlorophenyl N-cyclononylcarbamate
2,3,5-trichlorophenyl N-cyclodecylcarbamate
2,3,5-trichlorophenyl N-cycloundecylcarbamate
2,3,5-trichlorophenyl N-cyclododecylcarbamate
2,3,6-trichlorophenyl N-cyclopropylcarbamate
2,3,6-trichlorophenyl N-cyclobutylcarbamate
2,3,6-trichlorophenyl N-cyclopentylcarbamate
2,3,6-trichlorophenyl N-cyclohexylcarbamate
2,3,6-trichlorophenyl N-cycloheptylcarbamate
2,3,6-trichlorophenyl N-cyclooctylcarbamate
2,3,6-trichlorophenyl N-cyclononylcarbamate
2,3,6-trichlorophenyl N-cyclodecylcarbamate
2,3,6-trichlorophenyl N-cycloundecylcarbamate
2,3,6-trichlorophenyl N-cyclododecylcarbamate
2,3,6-trifluorophenyl N-cycloheptylcarbamate
2,4,5-trichlorophenyl N-cyclopropylcarbamate
2,4,5-trichlorophenyl N-cyclobutylcarbamate
2,4,5-trichlorophenyl N-cyclopentylcarbamate
2,4,5-trichlorophenyl N-cyclohexylcarbamate
2,4,5-trichlorophenyl N-cycloheptylcarbamate
2,4,5-trichlorophenyl N-cyclooctylcarbamate
2,4,5-trichlorophenyl N-cyclononylcarbamate
2,4,5-trichlorophenyl N-cyclodecylcarbamate
2,4,5-trichlorophenyl N-cycloundecylcarbamate
2,4,5-trichlorophenyl N-cyclododecylcarbamate
2-chloro-4,6-dibromophenyl N-cyclohexylcarbamate
2,4,5-triiodophenyl N-cyclohexylcarbamate
2,4,6-trichlorophenyl N-cyclopropylcarbamate
2,4,6-trichlorophenyl N-cyclobutylcarbamate
2,4,6-trichlorophenyl N-cyclopentylcarbamate
2,4,6-trichlorophenyl N-cyclohexylcarbamate
2,4,6-trichlorophenyl N-cycloheptylcarbamate
2,4,6-trichlorophenyl N-cyclooctylcarbamate
2,4,6-trichlorophenyl N-cyclononylcarbamate
2,4,6-trichlorophenyl N-cyclodecylcarbamate
2,4,6-trichlorophenyl N-cycloundecylcarbamate
2,4,6-trichlorophenyl N-cyclododecylcarbamate
3,4,5-trichlorophenyl N-cyclopropylcarbamate
3,4,5-trichlorophenyl N-cyclobutylcarbamate
3,4,5-trichlorophenyl N-cyclopentylcarbamate
3,4,5-trichlorophenyl N-cyclohexylcarbamate
3,4,5-trichlorophenyl N-cycloheptylcarbamate
3,4,5-trichlorophenyl N-cyclooctylcarbamate
3,4,5-trichlorophenyl N-cyclononylcarbamate
3,4,5-trichlorophenyl N-cyclodecylcarbamate
3,4,5-trichlorophenyl N-cycloundecylcarbamate
3,4,5-trichlorophenyl N-cyclododecylcarbamate
2,3,4,5-tetrachlorophenyl N-cyclopropylcarbamate
2,3,4,5-tetrachlorophenyl N-cyclobutylcarbamate
2,3,4,5-tetrachlorophenyl N-cyclopentylcarbamate
2,3,4,5-tetrachlorophenyl N-cyclohexylcarbamate
2,3,4,5-tetrachlorophenyl N-cycloheptylcarbamate
2,3,4,5-tetrachlorophenyl N-cyclooctylcarbamate
2,3,4,5-tetrachlorophenyl N-cyclononylcarbamate
2,3,4,5-tetrachlorophenyl N-cyclodecylcarbamate
2,3,4,5-tetrachlorophenyl N-cycloundecylcarbamate
2,3,4,5-tetrachlorophenyl N-cyclododecylcarbamate
2,3,4,5-tetrabromophenyl N-cyclooctylcarbamate
2,3,4,6-tetrachlorophenyl N-cyclopropylcarbamate
2,3,4,6-tetrachlorophenyl N-cyclobutylcarbamate
2,3,4,6-tetrachlorophenyl N-cyclopentylcarbamate
2,3,4,6-tetrachlorophenyl N-cyclohexylcarbamate
2,3,4,6-tetrachlorophenyl N-cycloheptylcarbamate
2,3,4,6-tetrachlorophenyl N-cylcooctylcarbamate
2,3,4,6-tetrachlorophenyl N-cyclononylcarbamate
2,3,4,6-tetrachlorophenyl N-cyclodecylcarbamate
2,3,4,6-tetrachlorophenyl N-cycloundecylcarbamate
2,3,4,6-tetrachlorophenyl N-cyclododecylcarbamate
2,3,5,6-tetrachlorophenyl N-cyclopropylcarbamate
2,3,5,6-tetrachlorophenyl N-cyclobutylcarbamate
2,3,5,6-tetrachlorophenyl N-cyclopentylcarbamate
2,3,5,6-tetrachlorophenyl N-cyclohexylcarbamate
2,3,5,6-tetrachlorophenyl N-cycloheptylcarbamate
2,3,5,6-tetrachlorophenyl N-cyclooctylcarbamate
2,3,5,6-tetrachlorophenyl N-cyclononylcarbamate
2,3,5,6-tetrachlorophenyl N-cyclodecylcarbamate
2,3,5,6-tetrachlorophenyl N-cycloundecylcarbamate
2,3,5,6-tetrachlorophenyl N-cyclododecylcarbamate
2,3,4,5,6-pentachlorophenyl N-cyclopropylcarbamate
2,3,4,5,6-pentachlorophenyl N-cyclobutylcarbamate
2,3,4,5,6-pentachlorophenyl N-cyclopentylcarbamate
2,3,4,5,6-pentachlorophenyl N-cyclohexylcarbamate
2,3,4,5,6-pentachlorophenyl N-cycloheptylcarbamate
2,3,4,5,6-pentachlorophenyl N-cyclooctylcarbamate
2,3,4,5,6-pentachlorophenyl N-cyclononylcarbamate
2,3,4,5,6-pentachlorophenyl N-cyclodecylcarbamate
2,3,4,5,6-pentachlorophenyl N-cycloundecylcarbamate
2,3,4,5,6-pentachlorophenyl N-cyclododecylcarbamate 2,3,4,5,6-pentabromophenyl N-cyclohexylcarbamate An especially suitable subclass of compounds comprises the 4-halophenyl N-cycloalkylcarbamates. Of these, the 4-chlorophenyl N-cycloalkylcarbamates are preferred. Examples are:

4-chlorophenyl N-cyclopropylcarbamate
4-chlorophenyl N-cyclobutylcarbamate
4-chlorophenyl N-cyclopentylcarbamate
4-chlorophenyl N-cyclohexylcarbamate
4-chlorophenyl N-cycloheptylcarbamate
4-chlorophenyl N-cyclooctylcarbamate
4-chlorophenyl N-cyclononylcarbamate
4-chlorophenyl N-cyclodecylcarbamate
4-chlorophenyl N-cycloundecylcarbamate
4-chlorophenyl N-cyclododecylcarbamate
4-fluorophenyl N-cyclopropylcarbamate
4-fluorophenyl N-cyclobutylcarbamate
4-fluorophenyl N-cyclopentylcarbamate
4-fluorophenyl N-cyclohexylcarbamate
4-fluorophenyl N-cycloheptylcarbamate
4-fluorophenyl N-cyclooctylcarbamate
4-fluorophenyl N-cyclononylcarbamate
4-fluorophenyl N-cyclodecylcarbamate
4-fluorophenyl N-cycloundecylcarbamate
4-fluorophenyl N-cyclododecylcarbamate
4-bromophenyl N-cyclopropylcarbamate
4-bromophenyl N-cyclobutylcarbamate
4-bromophenyl N-cyclopentylcarbamate
4-bromophenyl N-cyclohexylcarbamate
4-bromophenyl N-cycloheptylcarbamate
4-bromophenyl N-cyclooctylcarbamate
4-bromophenyl N-cyclononylcarbamate
4-bromophenyl N-cyclodecylcarbamate
4-bromophenyl N-cycloundecylcarbamate
4-bromophenyl N-cyclododecylcarbamate
4-iodophenyl N-cyclopropylcarbamate
4-iodophenyl N-cyclobutylcarbamate
4-iodophenyl N-cylcopentylcarbamate
4-iodophenyl N-cyclohexylcarbamate
4-iodophenyl N-cycloheptylcarbamate
4-iodophenyl N-cyclooctylcarbamate
4-iodophenyl N-cyclononylcarbamate
4-iodophenyl N-cyclodecylcarbamate
4-iodophenyl N-cycloundecylcarbamate
4-iodophenyl N-cyclododecylcarbamate When $R_2$ is alkyl the compounds of the invention are phenyl N-alkyl N-cycloalkylcarbamates. Examples of these compounds are:

phenyl N-methyl N-cyclopropylcarbamate
phenyl N-methyl N-cyclobutylcarbamate
phenyl N-methyl N-cyclopentylcarbamate
phenyl N-methyl N-cyclohexylcarbamate
phenyl N-methyl N-cycloheptylcarbamate
phenyl N-methyl N-cyclooctylcarbamate
phenyl N-methyl N-cyclononylcarbamate
phenyl N-methyl N-cyclodecylcarbamate
phenyl N-methyl N-cyclododecylcarbamate
phenyl N-methyl N-cyclododecylcarbamate
phenyl N-ethyl N-cyclopropylcarbamate
phenyl N-ethyl N-cyclobutylcarbamate
phenyl N-ethyl N-cyclopentylcarbamate
phenyl N-ethyl N-cyclohexylcarbamate
phenyl N-ethyl N-cycloheptylcarbamate
phenyl N-ethyl N-cyclooctylcarbamate
phenyl N-ethyl N-cyclononylcarbamate
phenyl N-ethyl N-cyclodecylcarbamate
phenyl N-ethyl N-cycloundecylcarbamate
phenyl N-ethyl N-cyclododecylcarbamate
phenyl N-propyl N-cyclohexylcarbamate
phenyl N-hexyl N-cyclopropylcarbamate
phenyl N-octyl N-cyclohexylcarbamate
2-chlorphenyl N-methyl N-cyclopropylcarbamate
2-chlorophenyl N-methyl N-cyclobutylcarbamate
2-chlorophenyl N-methyl N-cyclopentylcarbamate
2-chlorophenyl N-methyl N-cyclohexylcarbamate
2-chlorophenyl N-methyl N-cycloheptylcarbamate
2-chlorophenyl N-methyl N-cyclooctylcarbamate
2-chlorophenyl N-methyl N-cyclononylcarbamate
2-chlorophenyl N-methyl N-cyclodecylcarbamate
2-chlorophenyl N-methyl N-cycloundecylcarbamate
2-chlorophenyl N-methyl N-cyclododecylcarbamate
2bromophenyl N-methyl N-cyclobutylcarbamate
2-chlorophenyl N-ethyl N-cyclopropylcarbamate
2-chlorophenyl N-ethyl N-cyclobutylcarbamate
2-chlorophenyl N-ethyl N-cyclopentylcarbamate
2-chlorophenyl N-ethyl N-cyclohexylcarbamate
2-chlorophenyl N-ethyl N-cycloheptylcarbamate
2-chlorophenyl N-ethyl N-cyclooctylcarbamate
2-chlorophenyl N-ethyl N-cyclononylcarbamate
2-chlorophenyl N-ethyl N-cyclodecylcarbamate
2-chlorophenyl N-ethyl N-cycloundecylcarbamate
2-chlorophenyl N-ethyl N-cyclododecylcarbamate
2-fluorophenyl N-ethyl N-cyclopropylcarbamate
2-chlorophenyl N-butyl N-cyclopropylcarbamate
2-chlorophenyl N-(2,3,-dimethylpropyl) N-cyclopropylcarbamate
2-bromophenyl N-heptyl N-cyclooctylcarbamate
3-chlorophenyl N-methyl N-cyclopropylcarbamate
3-chlorophenyl N-methyl N-cyclobutylcarbamate
3-chlorophenyl N-methyl N-cyclopentylcarbamate
3-chlorophenyl N-methyl N-cyclohexylcarbamate
3-chlorophenyl N-methyl N-cycloheptylcarbamate
3-chlorophenyl N-methyl N-cyclooctylcarbamate
3-chlorophenyl N-methyl N-cyclononylcarbamate
3-chlorophenyl N-methyl N-cyclodecylcarbamate
3-chlorophenyl N-methyl N-cycloundecylcarbamate
3-chlorophenyl N-methyl N-cyclododecylcarbamate
3-iodophenyl N-methyl N-cyclohexylcarbamate
3-chlorophenyl N-ethyl N-cyclopropylcarbamate
3-chlorphenyl N-ethyl N-cyclobutylcarbamate
3-chlorophenyl N-ethyl N-cyclopentylcarbamate
3-chlorophenyl N-ethyl N-cyclohexylcarbamate
3-chlorophenyl N-ethyl N-cycloheptylcarbamate
3-chlorophenyl N-ethyl N-cyclooctylcarbamate
3-chlorophenyl N-ethyl N-cyclononylcarbamate
3-chlorophenyl N-ethyl N-cyclodecylcarbamate
3-chlorophenyl N-ethyl N-cycloundecylcarbamate
3-chlorophenyl N-methyl N-cyclododecylcarbamate
3-fluorophenyl N-ethyl N-cyclohexylcarbamate
3-fluorophenyl N-isopropyl N-cyclopropylcarbamate
3-chlorophenyl N-hexyl N-cyclopropylcarbamate
4-chlorophenyl N-methyl N-cyclopropylcarbamate
4-chlorophenyl N-methyl N-cyclobutylcarbamate
4-chlorophenyl N-methyl N-cyclopentylcarbamate
4-chlorophenyl N-methyl N-cyclohexylcarbamate
4-chlorophenyl N-methyl N-cycloheptylcarbamate
4-chlorophenyl N-methyl N-cyclooctycarbamate
4-chlorophenyl N-methyl N-cyclononylcarbamate
4-chlorophenyl N-methyl N-cyclodecylcarbamate
4-chlorophenyl N-methyl N-cycloundecylcarbamate
4-chlorophenyl N-methyl N-cyclododecylcarbamate
4-bromophenyl N-methyl N-cyclopropylcarbamate
4-bromophenyl N-methyl N-cyclobutylcarbamate
4-bromophenyl N-methyl N-cyclopentylcarbamate 4-bromophenyl N-methyl N-cyclohexylcarbamate
4-bromophenyl N-methyl N-cycloheptylcarbamate
4-bromophenyl N-methyl N-cyclooctylcarbamate
4-bromophenyl N-methyl N-cyclononylcarbamate
4-bromophenyl N-methyl N-cyclodecylcarbamate
4-bromophenyl N-methyl N-cycloundecylcarbamate
4-bromophenyl N-methyl N-cyclododecylcarbamate
4-fluorophenyl N-methyl N-cyclopropylcarbamate
4-fluorophenyl N-methyl N-cyclobutylcarbamate
4-fluorophenyl N-methyl N-cyclopentylcarbamate
4-fluorophenyl N-methyl N-cyclohexylcarbamate
4-fluorophenyl N-methyl N-cylcoheptylcarbamate
4-fluorophenyl N-methyl N-cyclooctylcarbamate
4-fluorophenyl N-methyl N-cyclononylcarbamate
4-fluorophenyl N-methyl N-cyclodecylcarbamate
4-fluorophenyl N-methyl N-cycloundecylcarbamate
4-fluorophenyl N-methyl N-cyclododecylcarbamate
4-iodophenyl N-methyl N-cyclopropylcarbamate
4-iodophenyl N-methyl N-cyclobutylcarbamate
4-iodophenyl N-methyl N-cyclopentylcarbamate
4-iodophenyl N-methyl N-cyclohexylcarbamate
4-iodophenyl N-methyl N-cycloheptylcarbamate
4-iodophenyl N-methyl N-cyclooctylcarbamate
4-iodophenyl N-methyl N-cyclononylcarbamate
4-iodophenyl N-methyl N-cyclodecylcarbamate
4-iodophenyl N-methyl N-cycloundecylcarbamate
4-iodophenyl N-methyl N-cyclododecylcarbamate
4-chlorophenyl N-ethyl N-cyclopropylcarbamate
4-chlorophenyl N-ethyl N-cyclobutylcarbamate
4-chlorophenyl N-ethyl N-cyclopentylcarbamate
4-chlorophenyl N-ethyl N-cyclohexylcarbamate
4-chlorophenyl N-ethyl N-cycloheptylcarbamate
4-chlorophenyl N-ethyl N-cyclooctylcarbamate
4-chlorophenyl N-ethyl N-cyclononylcarbamate
4-chlorophenyl N-ethyl N-cyclodecylcarbamate
4-chlorophenyl N-ethyl N-cycloundecylcarbamate
4-chlorophenyl N-ethyl N-cyclododecylcarbamate
4-chlorophenyl N-butyl N-cycloheptylcarbamate
4-chlorophenyl N-octyl N-cyclopropylcarbamate
4-chlorophenyl LN-(2,4,4,-trimethylpentyl) N-cyclopropylcarbamate
4-chlorophenyl N-butyl N-cyclododecylcarbamate
4-bromophenyl N-ethyl N-cyclopropylcarbamate
4-bromophenyl N-ethyl N-cyclobutylcarbamate
4-bromophenyl N-ethyl N-cyclopentylcarbamate
4-bromophenyl N-ethyl N-cyclohexylcarbamate
4-bromophenyl N-ethyl N-cycloheptylcarbamate
4-bromophenyl N-ethyl N-cyclooctylcarbamate
4-bromophenyl N-ethyl N-cyclononylcarbamate
4-bromophenyl N-ethyl N-cyclodecylcarbamate
4-bromophenyl N-ethyl N-cycloundecylcarbamate
4-bromophenyl N-ethyl N-cyclododecylcarbamate
4-bromo N-pentyl N-cycloheptylcarbamate
4-fluorophenyl N-ethyl N-cyclopropylcarbamate
4-fluorophenyl N-ethyl N-cylcobutylcarbamate
4-fluorophenyl N-ethyl N-cyclopentylcarbamate
4-fluorophenyl N-ethyl N-cyclohexylcarbamate
4-fluorophenyl N-ethyl N-cycloheptylcarbamate
4-fluorophenyl N-ethyl N-cyclooctylcarbamate
4-fluorophenyl N-ethyl N-cyclononylcarbamate
4-fluorophenyl N-ethyl N-cyclodecylcarbamate
4-fluorophenyl N-ethyl N-cycloundecylcarbamate
4-fluorophenyl N-ethyl N-cyclododecylcarbamate
4-fluorophenyl N-butyl N-cyclohexylcarbamate
4-iodophenyl N-ethyl N-cyclopropylcarbamate
4-iodophenyl N-ethyl N-cyclobutylcarbamate
4-iodophenyl N-ethyl N-cyclopentylcarbamate
4-iodophenyl N-ethyl N-cyclohexylcarbamate
4-iodophenyl N-ethyl N-cycloheptylcarbamate
4-iodophenyl N-ethyl N-cyclooctylcarbamate
4-iodophenyl N-ethyl N-cyclononylcarbamate
4-iodophenyl N-ethyl N-cyclodecylcarbamate
4-iodophenyl N-ethyl N-cycloundecylcarbamate
4-iodophenyl N-ethyl N-cyclododecylcarbamate
4-iodophenyl N-hexyl N-cyclobutylcarbamate
2,3,-dichlorophenyl N-methyl N-cyclopentylcarbamate
2,3-dichlorophenyl N-methyl N-cyclohexylcarbamate
2,3-dichlorophenyl N-ethyl N-cyclohexylcarbamate
2,3-dichlorophenyl N-ethyl N-cycloheptylcarbamate
2,3-dichlorophenyl N-(3-methylpropyl) N-cyclopropylcarbamate
2,3-difluorophenyl N-methyl N-cyclohexylcarbamate
2,4-dichlorophenyl N-methyl N-cyclohexylcarbamate
2,4-dichlorophenyl N-ethyl N-cycloheptylcarbamate
2,5-dichlorophenyl N-methyl N-cyclohexylcarbamate
2,5-difluorophenyl N-methyl N-cyclohexylcarbamate
2,6-dichlorophenyl N-methyl N-cyclopentylcarbamate
3,4-dichlorophenyl N-methyl N-cyclooctylcarbamate
3,4-dichlorophenyl N-ethyl N-cyclohexylcarbamate
3,4-dibromophenyl N-ethyl N-cyclohexylcarbamate
3,5-dichlorophenyl N-methyl N-cylcopropylcarbamate
3,5-dichlorophenyl N-heptyl N-cyclobutylcarbamate
2,3,4-trichlorophenyl N-methyl N-cyclopropylcarbamate
2,3,5-trichlorophenyl N-methyl N-cycloheptylcarbamate
2,3,6-trichlorophenyl N-ethyl N-cyclopropylcarbamate
2,4,5-trichlorophenyl N-(3-methylhexyl) N-cyclooctylcarbamate
2,4,6-trichlorophenyl N-methyl N-cyclooctylcarbamate
3,4,5-trichlorophenyl N-methyl N-cyclohexylcarbamate
2,3,4,5-tetrachlorophenyl N-methyl N-cyclopropylcarbamate
2,3,4,6-tetrachlorophenyl N-ethyl N-cyclopentylcarbamate
2,3,4,6-tetrachlorophenyl N-ethyl N-cyclohexylcarbamate
2,3,5,6-tetrachlorophenyl N-methyl N-cyclopropylcarbamate
2,3,4,5,6-pentachlorophenyl N-methyl N-cyclohexylcarbamate When $R_2$ is cycloalkyl, the compounds of the invention are phenyl N,N-dicycloalkylcarbamates. Examples of these compounds are:
phenyl N,N-dicyclopropylcarbamate
phenyl N-cyclopropyl N-cyclohexylcarbamate
2-chlorophenyl N-cyclopropyl N-cyclooctylcarbamate
3-chlorophenyl N-cyclobutyl N-cyclohexylcarbamate
3-chlorophenyl N-cyclopropyl N-cycloheptylcarbamate
4-chlorophenyl N,N-dicylcopropylcarbamate
4-iodophenyl N,N-dicyclopropylcarbamate 4-chlorophenyl N-cyclopropyl N-cyclohexylcarbamate
4-chlorophenyl N,N-dicyclohexylcarbamate
4-bromophenyl N,N-dicyclohexylcarbamate
4-bromophenyl N-cyclopropyl N-cyclododecylcarbamate
2,4-dichlorophenyl N,N-dicyclopropylcarbamate
3,4-dichlorophenyl N,N-dicyclopropylcarbamate
3,4-dichlorophenyl N,N-dicyclobutylcarbamate
2,3,5-trichlorophenyl N-cyclopropyl N-cyclohexylcarbamate
2-fluoro-4,5-dichlorophenyl N,N-dicycloproplycarbamate
2,3,4,6-tetrachlorophenyl N-cyclopropyl N-cyclohexylcarbamate
2,3,4,5,6-pentachlorophenyl N,N-dicyclohexylcarbamate The phenyl N-cycloalkylcarbamates may be prepared by reacting a cycloalkylisocyanate with a substituted or unsubstituted phenol or by reacting the appropriate chloroformate with a primary amine. The phenyl N-alkyl N-cycloalkylcarbamates and the phenyl N,N-dicycloalkylcarbamates may be produced by reacting the appropriate chloroformate with the appropriate secondary amine. All of these reactions may conveniently be conducted in a solvent.

EXAMPLE I

Into a 200 milliliter, one-necked, round-bottomed flask having a thermowell and equipped with a magnetic stirrer and an oil bath, was placed 12.9 grams of p-chlorophenol having a purity of 98.5 per cent by weight, 50 milliliters of benzene, and 1 milliliter of triethylamine. The flask was fitted, in series, with a reflux condenser, a 120 milliliter dropping funnel, and a Drierite tube. From the funnel 13.8 grams of cyclohexyl isocyanate was added drop-wise over a 10-minute period. Initially, the temperature was 25°C., but as the cyclohexyl isocyanate was added the temperature rose until it reached 35°C. Upon completion of the cyclohexyl isocyanate addition, the reaction mixture was heated to 77°C. at which temperature reflux occurred. After refluxing for 1 hour, the reaction mixture was slowly cooled to room temperature. The cooling resulted in the formation of a white crystalline product. About 50 additional milliliters of benzene was added and the temperature rose to about 65°C. to dissolve the product. Upon slowly cooling to room temperature, white crystalline product was again formed. This product was separated from the mother liquor by filtration and was washed with about 50 milliliters of normal hexane. After drying, the white crystalline material weighed 15.3 grams and melted at 166° to 168.5°C. The infrared spectrum of the material in carbon tetrachloride showed carbonyl absorption at 1745 cm$^{-1}$. The infrared spectrum of the material mulled in Nujol mineral oil showed carbonyl absorption at 1740 cm$^{-1}$ and at 1700 cm$^{-1}$. The product was analyzed for carbon, hydrogen, nitrogen, and chlorine. The results expressed in per cent by weight are shown in Table 1.

Table 1

Analysis of 4-Chlorophenyl N-cyclohexylcarbamate

|  | C | H | N | Cl |
|---|---|---|---|---|
| Calculated for C$_{13}$H$_{16}$ClNO$_2$ | 61.5 | 6.3 | 5.5 | 14.0 |

Table 1-Continued

Analysis of 4-Chlorophenyl N-cyclohexylcarbamate

|  | C | H | N | Cl |
|---|---|---|---|---|
| First Analysis | 61.17 | 6.13 | 5.32 | 14.15 |
| Second Analysis | 61.29 | 5.74 | 5.20 | — |

The product may be depicted as having the structural formula:

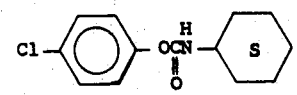

Effective amounts of the herbicide and carbamate additive may be applied either pre-emergence or post-emergence to the crop plant; however, pre-emergence applications are generally more advantageous. What constitutes an "effective amount" of the herbicidal component and an effective amount of carbamate additive in the formulation depends upon the specific herbicidal component employed, the specific carbamate additive employed, the identity and amount of other ingredients, if any, in the formulation, and the soil conditions where the formulation is to be applied.

The herbicidal component of the formulation is ordinarily applied at rates ranging up to about 500 pounds per acre, although greater amounts may be used if desired. More typically, these rates range from about 0.01 to about 200 pounds per acre. Rates ranging from about 0.05 to about 100 pounds per acre are more usual, and rates ranging from about 0.10 to about 20 pounds per acre are preferred.

The ratio of the carbamate additive to the herbicidal component is useful over a wide range. A ratio in the range of from about 0.02:1.00 to about 5.0:1.0 pounds of carbamate additive per pound of herbicidal component is generally used. A ratio of from about 0.08:1.00 to about 2.0:1.0 is typical, and a ratio of from about 0.15:1.00 to about 1.0:1.0 is preferred.

Several embodiments illustrating the utility of formulations containing both the herbicidal component and the carbamate additive may now be described. It is understood, of course, that while the actives, i.e., the herbicidal component and the carbamate additive, may be applied concurrently or they may be applied separately if they are both applied to the same area within a few days of each other.

In one embodiment of this invention, the herbicidal formulation may be used for control of weeds "pre-emergence" to the crop plants. Thus, the formulation is applied to the soil and/or weeds shortly prior to seeding or subsequent to seeding crop plants but prior to the emergence of the crop seedlings through the soil. While larger amounts of the herbicidal component may be applied as described above, usually the amount to be applied will range from about 0.25 to about 20 pounds per acre. One factor influencing the rate is the depth the crop seed is located beneath the surface of the soil. Generally speaking, greater amounts of the herbicidal component may be used as the seed is positioned deeper in the soil.

In another embodiment, the formulation is applied to the soil close to but not directly above the seed. This may be achieved for row crops by applying the formulation as one or more sidebands.

In still another embodiment, the formulation is applied as a layer below the surface of the soil. The layer may conveniently be located above or below the seed, depending upon the tolerance of the seed. Subsoil layering can also be used for the control of perennial weeds growing with established herbaceous or woody crops.

According to a further embodiment of this invention, the formulation is applied to the soil and/or weeds concurrently with the application of the crop seed.

According to still another embodiment of this invention, the herbicidal formulation is applied to the soil and/or weeds prior to the planting of crops. This method permits additional flexibility because amounts of formulation in excess of the amount which would kill or retard the crop plant may be applied if desired. Sufficient time is then allowed for the herbicidal characteristics of the formulation to abate to safe levels. Crop plants or seeds may then be set out. Exemplary application rates of the herbicidal component of the formulation are about 0.25 to about 500 pounds per acre. Rates in excess of 500 pounds per acre may be used although seldom desirable because of economic considerations. Should it not be desirable to use the greater application rate, the herbicidal component may be applied to the soil at the more usual rates such as about 0.25 to about 20 pounds per acre. Crop plants or seeds may then be set out immediately or after a delay, as desired.

A further embodiment of this invention allows the herbicidal formulation to be applied to the area containing the weeds and crop plants which have emerged from the soil. The application rate is adjusted so that the growth of the weeds is inhibited while the plant crop suffers no significant damage. The rate of herbicidal component application is generally less than when a killing of the weeds is desired and usually may be within the range of about 0.1 to about 20 pounds per acre.

A directed treatment is another useful form of post-emergence application. In accordance with this embodiment, the formulation is applied to the weeds and soil but not to the crop plant itself. This is usually accomplished by applying one or more sidebands to the sides of a row of crop plants.

While general ranges of application rates have been given in the above embodiments, it is recognized that both the optimum and useful amounts will vary depending upon the plant crop involved, the weeds encountered, the particular carbamate used, and the effect desired.

The herbicidal formulations of this invention may be applied to the soil and/or weeds in several different ways. Effective amounts of the active ingredients may be applied in the form of crystals, powder, solution, or emulsion, with or without diluent. Diluents may include but are not limited to water, organic solvents, and inert solids. Oils are especially advantageous and are exemplified by diesel oil, herbicidal oils, and nonphytotoxic oils. The formulation may be impregnated or coated on inert granules such as, for example, attapulgite clay, corn cobs, sawdust, or bentonite. The herbicidal component and carbamate additive content of these granular products is usually less than about 50 per cent by weight. Typically, the content rantes from about 1 to about 20 per cent by weight.

An example of a liquid concentrate is as follows:

| | |
|---|---|
| Isopropyl N-(3-chlorophenyl)carbamate | 36.2% w/w |
| 4-Chlorophenyl N-cyclohexylcarbamate | 9.0 |
| Xylene | 35.6 |
| Propylene glycol | 10.0 |
| Normal amyl acetate | 4.0 |
| Atlox 3413 F emulsifier | 3.8 |
| Atlox 3404 emulsifier | 1.4 |

An example of a granular formulation which may be used is the following:

| | |
|---|---|
| Isopropyl N-(3-chlorophenyl)carbamate | 10% w/w |
| 4-Chlorophenyl N-cyclohexylcarbonate | 2.5 |
| Xylene | 5 |
| Montmorillonite | 82.5 |

EXAMPLE II

For pre-emergence testing, appropriate weed species are seeded in individual disposable 3-inch square containers containing about 2 inches of soil. The seeded containers are then placed on a carrying tray for treatment.

For post-emergence testing, appropriate weed species are seeded by growth-time requirement schedules in individual disposable 3-inch square containers containing about 2 inches of soil, watered as required, and maintained under greenhouse conditions. When all weeds have reached suitable growth development, generally first true leaf stage, plants appropriate to pertaining test requirements are selected for uniformity of growth and development. One container of each weed, averaging up to 50 plants per individual container, is then placed on a carrying tray for treatment.

The test compound is formulated in a solvent mixture of 90% acetone, 8% methanol, and 2% dimethylformamide by volume.

Each carrying tray of pre-emergence and/or post emergence containers, placed on a conveyor belt having a linear speed of 1.5 miles per hour, trips a microswitch which, in turn, activates a solenoid valve and releases the formulated compound under test. The compound under test is discharged as sprays at a rate of 50 gallons per acre. After spraying directly on the seeded soil surface of the containers used in pre-emergence testing, a small amount of sand, usually one-eighth to one-fourth inch in depth, is applied to cover the seeds. Containers for both pre-emergence and post-emergence testing are then removed to the greenhouse and held for observation.

Pre-emergence and post-emergence treatments are observed daily for interim response, final observations being made 19 days after treatment. Each result is reported as an Injury Rating which is represented as follows: 0 — no visible effect, 1, 2, 3 — slight injury, plant usually recovered with little or no reduction in top growth; 4, 5, or 6 — moderate injury, plants usually recovered but with reduced top growth; 7, 8, or 9 — severe injury, plants usually did not recover; 10 — all plants killed. The results, including the identity of the test compound, the identity of the test plants, and the rate of application of the test compounds, expressed in pounds per acre, are shown in Table 2.

Table 2

Herbicidal Effectiveness of 4-Chlorophenyl N-cyclohexylcarbamate

| Test Plant | Pre-emergence | | Post-emergence | |
|---|---|---|---|---|
| | 2 lb/A | 1 lb/A | 2 lb/A | 1 lb/A |
| Yellow Nutsedge (*Cyperus esculentus* L.) | 0 | 0 | 0 | 0 |
| Wild Oats (*Avena fatua* L.) | 0 | 0 | 0 | 0 |
| Jimsonweed (*Datura stramonium* L.) | 0 | 0 | 0 | 0 |
| Velvetleaf (*Abutilon theophrasti* Medic.) | 0 | 0 | 0 | 0 |
| Johnsongrass (*Sorghum halepense* Pers.) | 0 | 0 | 0 | 0 |
| Mustard (*Brassica kaber* L. C. Wheeler Var. *pinnatifida* L. C. Wheeler) | 0 | 0 | 0 | 0 |
| Yellow Foxtail (*Setaria glauca* Beauv.) | 0 | 0 | 0 | 0 |
| Barnyardgrass (*Echinochloa crusgalli* Beauv.) | 0 | 0 | 0 | 0 |
| Crabgrass (*Digitaria sanguinalis* Scop.) | 0 | 0 | — | — |
| Buckwheat (*Polygonum convolvulus* L.) | 0 | 0 | 0 | 0 |
| Morning Glory (mixture of *Ipomoea purpurea* Roth and *Ipomoea hederacea* Jacq.) | 0 | 0 | 0 | 0 |
| Red Kidney Bean (*Phaseolus vulgaris* L.) | — | — | 0 | 0 |
| Pigweed (*Amaranthus retroflexus* L.) | — | — | 0 | 0 |
| Untreated Controls | Normal | Normal | Normal | Normal |

EXAMPLE III

Test compounds were thoroughly incorporated with unsterilized sandy loam soil in mechanical blenders. The treated soils and untreated control soils were then stored moist in plastic boxes in dim light at room temperature (70°–80°F.). Each box contained approximately 6.5 pounds of soil, and, for each pound per acre of chemical desired, 16.2 milligrams of chemical. Aliquots of soil were removed immediately after chemical application and at bi-weekly intervals thereafter and placed in pots in a layer approximately 1 inch deep over untreated, sterilized soil. The pots were seeded with appropriate indicator plants, moved to the greenhouse, and held for a rating period of 3 to 4 weeks. Injury Ratings as described in Example II were then assigned. All treatments were replicated. The results, including the identity of the test compounds, the identity of the test plants, and the rates of application of the test compounds are shown in Tables 3 and 4. The interval reported is the time between chemical treatment of the soil and removal of soil aliquots for bioassay. Abbreviations are:

| | |
|---|---|
| VTLF | Velvetleaf (*Abutilon theophrasti* Medic.) |
| MNGY | Morning Glory (mixture of *Impomoea purpurea* Roth and *Ipomoea hederacea* Jacq.) |
| BKWT | Buckwheat (*Polygonum convolvulus* L.) |
| CBGS | Crabgrass (*Digitaria sanguinalis* Scop.) |
| BNGS | Barnyardgrass (*Echinochloa crusgalli* Beauv.) |
| QKGS | Quackgrass (*Agropyron repens* [L.] Beauv.) |

Table 3

Persistence of Herbicidal Activity of Soil Incorporated Isopropyl N-(3-chlorophenyl)carbamate at Four Pounds Per Acre

| Interval, Weeks | Injury Ratings | | | | | |
|---|---|---|---|---|---|---|
| | VTLF | MNGY | BKWT | CBGS | BNGS | QKGS |
| 0 | 4 | 8 | 9 | 4 | 4 | 10 |
| 2 | 0 | 6 | 9 | 0 | 4 | 10 |
| 4 | 0 | 3 | 9 | 0 | 0 | 7 |
| 6 | 0 | 0 | 3 | 0 | 0 | 4 |
| 8 | 0 | 0 | 0 | 0 | 0 | 0 |
| 10 | 0 | 0 | 0 | 0 | 0 | 0 |
| 12 | 0 | 0 | 0 | 0 | 0 | 0 |
| 14 | 0 | 0 | 0 | 0 | 0 | 0 |

Table 4

Persistence of Herbicidal Activity of Soil Incorporated Isopropyl N-(3-chlorophenyl)carbamate at Four Pounds per Acre in Combination with 4-Chlorophenyl N-cyclohexylcarbamate at One Pound Per Acre

| Interval, Weeks | Injury Ratings | | | | | |
|---|---|---|---|---|---|---|
| | VTLF | MNGY | BKWT | CBGS | BNGS | QKGS |
| 0 | 5 | 7 | 10 | 6 | 8 | 10 |
| 2 | 2 | 7 | 9 | 6 | 8 | 10 |
| 4 | 0 | 7 | 9 | 2 | 8 | 10 |
| 6 | 0 | 8 | 9 | 3 | 8 | 10 |
| 8 | 2 | 6 | 9 | 6 | 6 | 10 |
| 10 | 4 | 5 | 9 | 8 | 7 | 10 |
| 12 | 3 | 6 | 9 | 7 | 7 | 10 |
| 14 | 0 | 5 | 9 | 5 | 5 | 10 |

EXAMPLE IV

The post-emergence procedure of Example II was repeated using different test compounds. In this example 4-chlorophenyl N-cyclohexylcarbamate was formulated as described in Example II while 3,4-dichloropropionanilide was formulated as an emulsifiable concentrate. The 3,4-dichloropropionanilide application was replicated twice to provide some appreciation for the experimental variability. The results, including the identity of the test compounds, the identity of the test plants and the rate of application of the test compounds, are shown in Tables 5 and 6.

Table 5

Herbicidal Effectiveness of 3,4-Dichloropropionanilide at One-Half Pound Per Acre

| Test Plant | Post-Emergence | |
|---|---|---|
| | 1st Replicate | 2nd Replicate |
| Johnsongrass (*Sorghum halepense* Pers.) | 5 | 6 |
| Morning Glory (mixture of *Impomoea purpurea* Roth and *Ipomoea hederacea* Jacq.) | 8 | 7 |
| Jimsonweed (*Datura stramonium* L.) | 10 | 9 |

Table 5-Continued

Herbicidal Effectiveness of 3,4-Dichloropropionanilide at One-Half Pound Per Acre

| Test Plant | Post-Emergence | |
|---|---|---|
| | 1st Replicate | 2nd Replicate |
| Barnyardgrass (*Echinochloa crusgalli* Beauv.) | 6 | 9 |

Table 6

Herbicidal Effectiveness of 3,4-Dichloropropionanilide at One-Half Pound Per Acre in Combination With 4-Chlorophenyl N-cyclohexylcarbamate at One-Half Pound Per Acre

| Test Plant | Post-Emergence |
|---|---|
| Johnsongrass (*Sorghum halepense* Pers.) | 6 |
| Morning Glory (mixture of *Ipomoea purpurea* Roth and *Ipomoea hederacea* Jacq.) | 9 |
| Jimsonweed (*Datura stramonium* L.) | 10 |
| Barnyardgrass (*Echinochloa crusgalli* Beauv.) | 10 |

I claim:

1. A herbicidal composition containing as a herbicidal component a member of the group consisting of isopropyl N-phenylcarbamate, isopropyl N-(3-chlorophenyl)carbamate, N,N-diallyl-2-chloroacetamide, 3,4-dichloropropionanilide, and 3,4-dichloromethacrylanilide, and further containing a 4-halophenol N-cycloalkylcarbamate compound, said cycloalkyl group containing from 3 to 12 carbon atoms, in an amount of from 0.02 to 5 pounds per pound of said member, said amount being sufficient to extend the soil life of said member.

2. The method of extending the soil life of a herbicidal amount of a member of the group consisting of isopropyl N-phenylcarbamate, isopropyl N-(3-chlorophenyl)carbamate, N,N-diallyl-2-chloroacetamide, 3,4-dichloropropionanilide, and 3,4-dichloromethacrylanilide which comprises formulating in admixture with said member a soil life extending amount of a 4-halophenyl N-cycloalkylcarbamate compound, said cycloalkyl group containing from 3 to 12 carbon atoms.

3. A method of controlling weeds comprising applying to the soil a weed control amount of a member of the group consisting of isopropyl N-phenylcarbamate, isopropyl N-(3-chlorophenyl)carbamate, N,N-diallyl-2-chloroacetamide, 3,4-dichloropropionanilide, and 3,4-dichloromethacrylanilide, and a 4-halophenyl N-cyclohexylcarbamate compound, said cycloalkyl group containing 3 to 12 carbon atoms, in an amount of from 0.02 to 5 pounds per pound of said member sufficient to extend the soil life of said member.

4. The herbicidal composition of claim 1 wherein said member is isopropyl N-phenylcarbamate.

5. The herbicidal composition of claim 4 wherein said compound is a 4-chlorophenyl N-cycloalkylcarbamate wherein the cycloalkyl group contains from 6 to 8 carbon atoms.

6. The herbicidal composition of claim 4 wherein said compound is 4-chlorophenyl N-cyclohexylcarbamate.

7. The herbicidal composition of claim 1 wherein said member is isopropyl N-(3-chlorophenyl)carbamate.

8. The herbicidal composition of claim 7 wherein said compound is a 4-chlorophenyl N-cycloalkylcarbamate wherein the cycloalkyl group contains from 6 to 8 carbon atoms.

9. The herbicidal composition of claim 7 wherein said compound is 4-chlorophenyl N-cyclohexylcarbamate.

10. The method of claim 2 wherein said member is isopropyl N-phenylcarbamate.

11. The method of claim 10 wherein said compound is a 4-chlorophenyl N-cycloalkylcarbamate wherein the cycloalkyl group contains from 6 to 8 carbon atoms.

12. The method of claim 10 wherein said compound is 4-chlorophenyl N-cyclohexylcarbamate.

13. The method of claim 2 wherein said member is isopropyl N-(3-chlorophenyl)carbamate.

14. The method of claim 13 wherein said compound is a 4-chlorophenyl N-cycloalkylcarbamate wherein the cycloalkyl group contains from 6 to 8 carbon atoms.

15. The method of claim 13 wherein said compound is 4-chlorophenyl N-cyclohexylcarbamate.

16. The method of claim 3 wherein said member is isopropyl N-phenylcarbamate.

17. The method of claim 16 wherein said compound is a 4-chlorophenyl N-cycloalkylcarbamate wherein the cycloalkyl group contains from 6 to 8 carbon atoms.

18. The method of claim 16 wherein said compound is 4-chlorophenyl N-cyclohexylcarbamate.

19. The method of claim 3 wherein said member is isopropyl N-(3-chlorophenyl)carbamate.

20. The method of claim 19 wherein said compound is a 4-chlorophenyl N-cycloalkylcarbamate wherein the cycloalkyl group contains from 6 to 8 carbon atoms.

21. The method of claim 19 wherein said compound is 4-chlorophenyl N-cyclohexylcarbamate.

* * * * *